United States Patent [19]

Bryzek et al.

[11] Patent Number: 6,006,607
[45] Date of Patent: Dec. 28, 1999

[54] PIEZORESISTIVE PRESSURE SENSOR WITH SCULPTED DIAPHRAGM

[75] Inventors: Janusz Bryzek, Fremont; David W. Burns, San Jose; Sean S. Cahill, Palo Alto; Steven S. Nasiri, Saratoga, all of Calif.; James B. Starr, St. Paul, Minn.

[73] Assignee: Maxim Integrated Products, Inc., Sunnyvale, Calif.

[21] Appl. No.: 09/144,118

[22] Filed: Aug. 31, 1998

[51] Int. Cl.$^6$ .................................................. G01L 9/06
[52] U.S. Cl. .............................. 73/727; 73/726; 338/42
[58] Field of Search .............................. 73/727, 721, 726, 73/720; 338/42

[56] References Cited

U.S. PATENT DOCUMENTS

| | | |
|---|---|---|
| 3,213,400 | 10/1965 | Gieb ..................................... 73/720 X |
| 3,247,719 | 4/1966 | Chelner . |
| 3,328,649 | 6/1967 | Rindner et al. . |
| 3,739,315 | 6/1973 | Kurtz et al. . |
| 3,994,009 | 11/1976 | Hartlaub . |
| 4,019,388 | 4/1977 | Hall, II et al. . |
| 4,023,562 | 5/1977 | Hynecek et al. . |
| 4,033,787 | 7/1977 | Marshall . |
| 4,040,297 | 8/1977 | Karsmakers et al. . |
| 4,050,049 | 9/1977 | Youmans . |
| 4,063,209 | 12/1977 | Kurtz et al. ........................... 338/42 X |
| 4,125,820 | 11/1978 | Marshall . |
| 4,129,042 | 12/1978 | Rosvold . |
| 4,229,979 | 10/1980 | Greenwood . |
| 4,236,137 | 11/1980 | Kurtz et al. . |
| 4,241,325 | 12/1980 | Di Giovanni . |
| 4,276,533 | 6/1981 | Tominaga et al. . |
| 4,295,115 | 10/1981 | Takahashi et al. . |
| 4,317,126 | 2/1982 | Gragg, Jr. . |
| 4,399,707 | 8/1983 | Wamstad . |
| 4,467,656 | 8/1984 | Mallon et al. . |
| 4,502,335 | 3/1985 | Wamstad et al. . |
| 4,609,966 | 9/1986 | Kuisma . |
| 4,655,088 | 4/1987 | Adams . |
| 4,656,454 | 4/1987 | Rosenberger . |
| 4,665,754 | 5/1987 | Glenn et al. . |
| 4,686,764 | 8/1987 | Adams et al. . |
| 4,737,756 | 4/1988 | Bowman . |
| 4,763,098 | 8/1988 | Glenn et al. . |
| 4,771,639 | 9/1988 | Saigusa et al. . |
| 4,773,269 | 9/1988 | Knecht et al. . |
| 4,790,192 | 12/1988 | Knecht et al. . |
| 4,800,758 | 1/1989 | Knecht et al. . |
| 4,842,685 | 6/1989 | Adams . |
| 4,879,903 | 11/1989 | Ramsey et al. . |
| 4,905,575 | 3/1990 | Knecht et al. . |
| 4,918,992 | 4/1990 | Mathias . |

(List continued on next page.)

FOREIGN PATENT DOCUMENTS

| | | |
|---|---|---|
| 4227893 | 4/1993 | Germany . |
| 96/26424 | 8/1996 | WIPO . |

Primary Examiner—Joseph L. Felber
Attorney, Agent, or Firm—Blakely, Sokoloff, Taylor & Zafman LLP

[57] ABSTRACT

The present invention is a semiconductor pressure sensor. In one embodiment, the semiconductor pressure sensor includes a diaphragm having a first thickness and at least cone raised boss that is coupled to a first side of the diaphragm. The at least one raised boss increases the diaphragm thickness in the region occupied by the at least one raised boss to a second thickness. A plurality of piezoresistors are disposed on a second side of the diaphragm in regions of the first thickness. In another embodiment, a semiconductor pressure sensor diaphragm includes at least one raised boss disposed along a central axis on a first side of the diaphragm. At least two raised bridge regions are disposed along the central axis, interconnecting the at least one raised boss and a diaphragm edge. Each raised bridge region is narrower than the raised boss. A plurality of piezoresistors are disposed on the raised bridge regions of the diaphragm along the central axis.

30 Claims, 3 Drawing Sheets

U.S. PATENT DOCUMENTS

| | | |
|---|---|---|
| 4,942,383 | 7/1990 | Lam et al. . |
| 4,972,716 | 11/1990 | Tobita et al. . |
| 4,996,627 | 2/1991 | Zias et al. . |
| 5,064,165 | 11/1991 | Jerman . |
| 5,142,912 | 9/1992 | Frische . |
| 5,156,052 | 10/1992 | Johnson et al. . |
| 5,157,972 | 10/1992 | Broden et al. . |
| 5,172,205 | 12/1992 | French et al. . |
| 5,174,156 | 12/1992 | Johnson et al. . |
| 5,177,579 | 1/1993 | Jerman . |
| 5,178,015 | 1/1993 | Loeppert et al. . |
| 5,184,107 | 2/1993 | Maurer . |
| 5,186,055 | 2/1993 | Kovacich et al. . |
| 5,188,983 | 2/1993 | Guckel et al. . |
| 5,209,118 | 5/1993 | Jerman . |
| 5,220,835 | 6/1993 | Stephan . |
| 5,257,546 | 11/1993 | Tobita et al. . |
| 5,295,395 | 3/1994 | Hocker et al. . |
| 5,333,504 | 8/1994 | Lutz et al. . |
| 5,412,994 | 5/1995 | Cook et al. . |
| 5,438,877 | 8/1995 | Vowles et al. . |
| 5,454,270 | 10/1995 | Brown et al. . |
| 5,459,351 | 10/1995 | Bender . |
| 5,465,626 | 11/1995 | Brown et al. . |
| 5,477,738 | 12/1995 | Tobita et al. . |
| 5,483,834 | 1/1996 | Frick . |
| 5,509,312 | 4/1996 | Donzier et al. . |
| 5,515,732 | 5/1996 | Willcox et al. . |
| 5,539,236 | 7/1996 | Kurtz et al. . |
| 5,600,071 | 2/1997 | Sooriakumar et al. . |
| 5,646,072 | 7/1997 | Maudie et al. . |
| 5,684,253 | 11/1997 | Bonne et al. . |

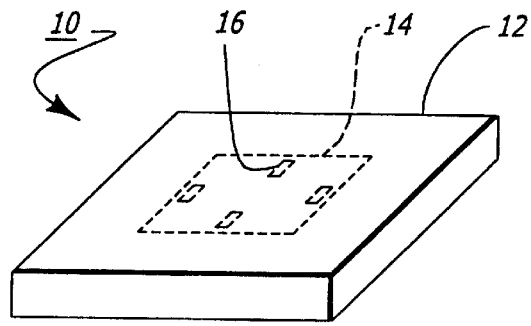
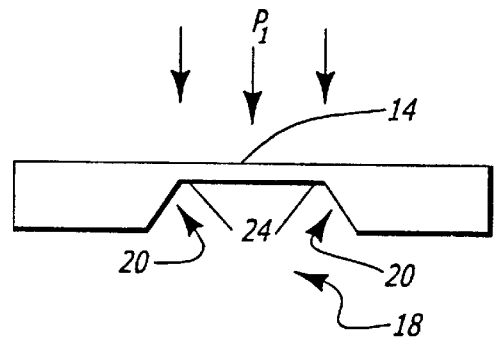
FIG. 1a
PRIOR ART
FIG. 1b
PRIOR ART
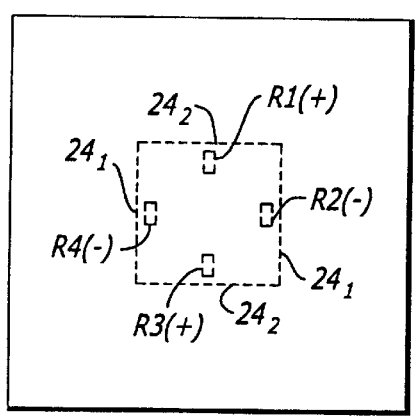
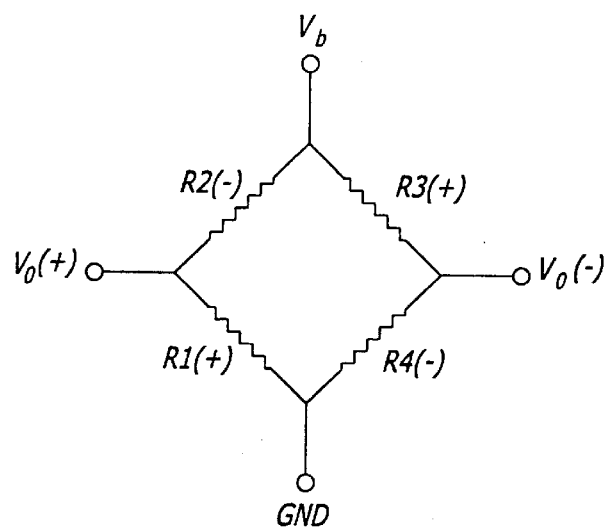
FIG. 1c
PRIOR ART
FIG. 1d
PRIOR ART

PIEZORESISTIVE PRESSURE SENSOR WITH SCULPTED DIAPHRAGM

BACKGROUND OF THE INVENTION

1. Field of the Invention

The present invention relates generally to pressure sensors, and specifically, to micro-machined piezoresistive pressure sensors.

2. Background Information

A conventional prior art silicon-based pressure sensor consists of a semiconductor die having a thinned region or diaphragm, a sensing means for sensing diaphragm displacement, and an enclosure with one or more pressure ports. Pressure from external sources is typically communicated to one or both sides of the diaphragm using gaseous or liquid media. Differential pressure across the diaphragm results in bending of the diaphragm, which is typically detected by means such as stress-sensitive piezoresistors strategically implanted into the silicon diaphragm.

FIG. 1a illustrates a prior art anisotropically etched silicon pressure sensor 10. The pressure sensor 10 includes a sensor die 12 having a silicon diaphragm 14 in a central region of the sensor die 12, and four strain-sensitive piezoresistors 16 placed around the periphery of the central region, as shown in FIG. 1a. Referring now to FIG. 1b, a cross-sectional view of the prior art anisotropically etched silicon pressure sensor 10 may be seen. This view shows an underlying cavity 18 formed during anisotropic etching, and slanted flanks 20 which define the diaphragm edge 24.

FIG. 1c illustrates the typical piezoresistor placement of the prior art anisotropically etched silicon pressure sensor 10 of FIG. 1a. Referring to FIG. 1c, resistors R2 and R4 are mounted parallel to their respective diaphragm edges 24, and resistors R1 and R3 are mounted perpendicular to their respective diaphragm edges $24_2$. The resistors are formed in a Wheatstone bridge configuration, as shown in FIG. 1d, where the resistances of resistors R1 and R3 increase in value with increased pressure P1 (FIG. 1b) and the resistances of resistors R2 and R4 decrease in value with increased pressure P1. With a constant voltage Vb or constant current applied to the bridge, an output voltage Vo of the bridge varies as a function of the applied pressure P1.

SUMMARY OF THE INVENTION

The present invention is a new improved semiconductor pressure sensor. In one embodiment, the semiconductor pressure sensor includes a diaphragm having a first thickness, and at least one raised boss that is coupled to a first side of the diaphragm. The at least one raised boss increases the diaphragm thickness in the region occupied by the at least one raised boss to a second thickness. A plurality of piezoresistors are disposed on a second side of the diaphragm in regions of the first thickness.

BRIEF DESCRIPTION OF THE DRAWINGS

FIG. 1a illustrates a perspective view of a prior art anisotropically etched silicon pressure sensor.

FIG. 1b illustrates a cross-sectional view of the prior art anisotropically etched silicon pressure sensor.

FIG. 1c illustrates the typical piezoresistor placement of the prior art anisotropically etched silicon pressure sensor.

FIG. 1d illustrates a schematic diagram of the piezoresistive Wheatstone bridge.

DETAILED DESCRIPTION

The present invention is a piezoresistive pressure sensor having a sculpted diaphragm. In one embodiment, the pressure sensor includes a semiconductor diaphragm having a first thickness and at least one raised boss (e.g., three) that is coupled to a first side of the diaphragm. The at least one raised boss increases the diaphragm thickness in the region occupied by the at least one raised boss to a second thickness. A plurality of piezoresistors are disposed on a second side of the diaphragm in regions of the first thickness. In another embodiment, the semiconductor pressure sensor includes a semiconductor diaphragm and a single boss that is coupled to a first side of the diaphragm. A plurality of piezoresistors are disposed on a second side of the diaphragm in regions not occupied by the single boss.

In yet another embodiment, the semiconductor pressure sensor diaphragm includes at least one raised boss disposed along a central axis on a first side of the diaphragm. At least two raised bridge regions are disposed along the central axis, interconnecting the at least one raised boss and a diaphragm edge. Each raised bridge region is narrower than the raised boss. A plurality of piezoresistors are disposed on the raised bridge regions of the diaphragm along the central axis.

Figure 2:
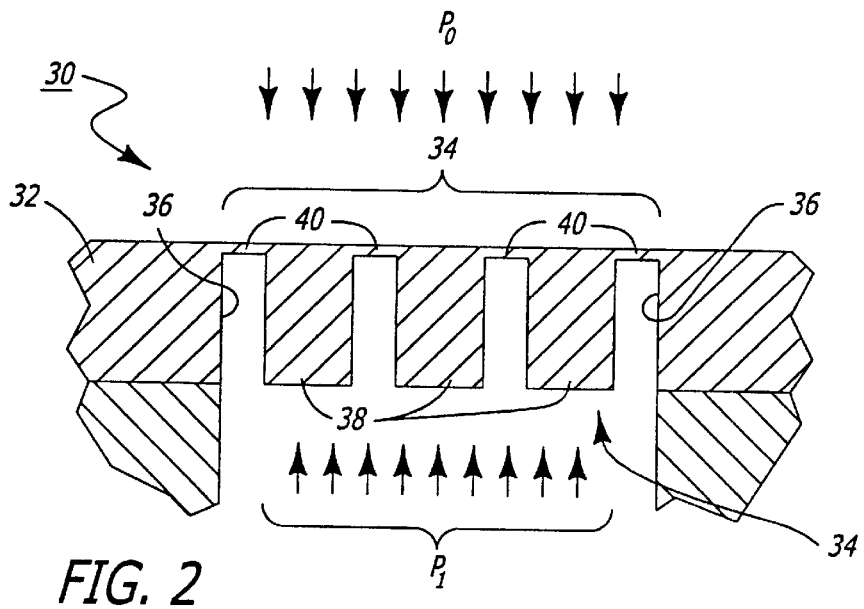
FIG. 2 illustrates a cross-sectional view of a triple boss diaphragm configuration, according to one embodiment of the present invention.

FIG. 2 illustrates a cross-sectional view of a triple boss diaphragm configuration, according to one embodiment of the present invention. Referring to FIG. 2, a semiconductor pressure sensor 30 which includes a silicon sensor die 32 and a diaphragm 34 is provided. The diaphragm 34 is a deformable member formed in the silicon sensor die 32 and is structurally supported at its periphery 36. The diaphragm 34 is exposed to applied pressure on one or both sides (e.g., P1 and/or P0). The diaphragm 34 is substantially planar and includes three rigid members 38 (hereinafter referred to as "bosses") of increased thickness arrayed across the midsection or axis of the pressure sensor (see, e.g., FIG. 5).

In the embodiment shown in FIG. 2, the bosses 38 are equally spaced from the periphery 36 and each other. However, this is not a requirement as the bosses 38 may be spaced apart in unequal increments. The regions 40 between the bosses 38 and between a boss 38 and the periphery 36 have a smaller thickness than the thickness of the bosses 38 and are hereinafter referred to as "thinner regions". The bosses 38 locally stiffen the diaphragm 34 and focus the bending stresses on the thinner regions 40.

Figure 3:
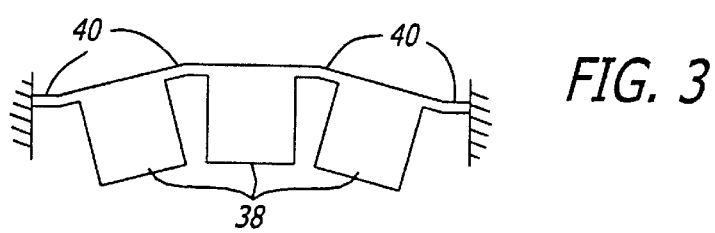
FIG. 3 illustrates the displacement profile of the triple boss diaphragm configuration of FIG. 2.
Figure 4:
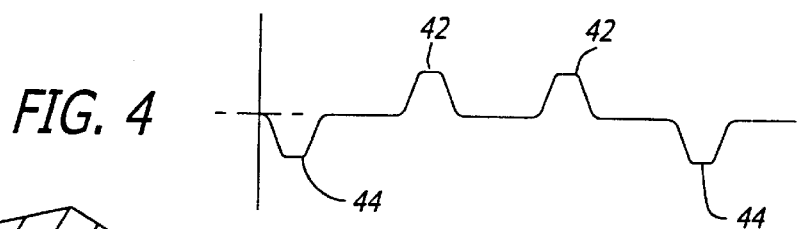
FIG. 4 illustrates the stress profile along the upper surface of the diaphragm, which is associated with the bending profile of FIG. 3.

FIG. 3 illustrates the displacement profile of the triple boss diaphragm configuration of FIG. 2. Although this figure is greatly exaggerated, the amount of diaphragm bending is much higher in the thinner regions 40 than the negligible bending in the regions stiffened by the bosses 38. FIG. 4 illustrates the stress profile along the upper surface of the diaphragm. The stress profile is associated with the bending profile of FIG. 3. As shown in FIG. 4, high tensile stresses 42 are found in the thinner regions 40 between the bosses 38 and high compressive stresses 44 are found in the thinner regions next to the diaphragm periphery 36. It is these thinner regions 40 where the piezoresistors are selectively positioned, as shown in FIG. 5.

Figure 5:
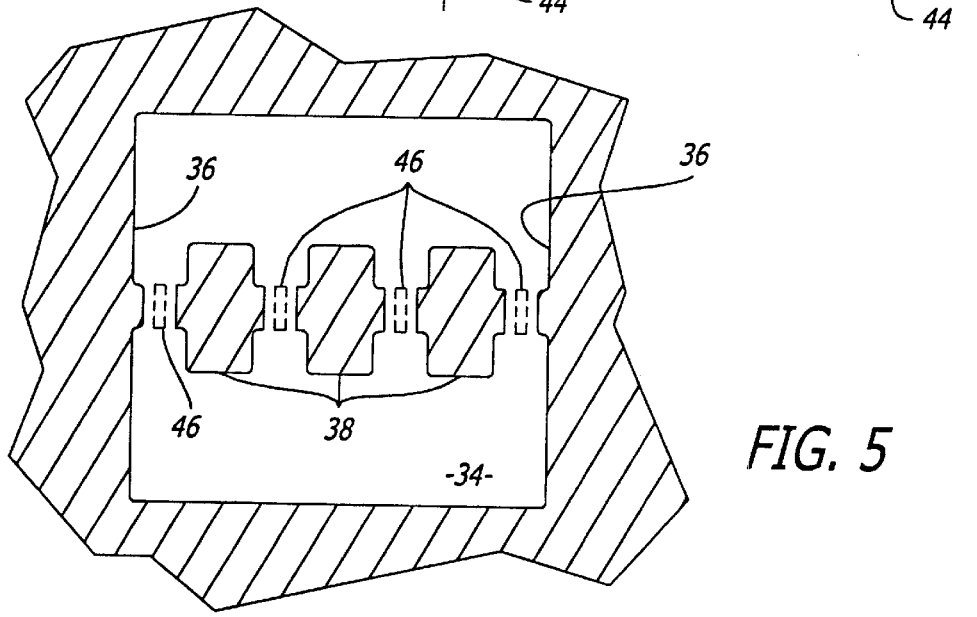
FIG. 5 illustrates a backside view of the triple boss configuration.

FIG. 5 illustrates a backside view of the triple boss diaphragm configuration. In this view, four piezoresistors 46 are shown for clarity purposes only, as they are actually disposed on the topside of the diaphragm 34. In the embodiment being described, two of the resistors are located in the thinner regions of tensile stress (between the bosses 38) and the other two are located in the thinner regions of compressive stress (between a boss 38 and periphery 36). In one embodiment, the piezoresistors are formed in the middle of the thinner regions. This balances any effects of stress from the bosses 38. The piezoresistors 46 are connected in a Wheatstone bridge configuration.

Note that the piezoresistors 46 are all similarly aligned, i.e., the piezoresistors 46 are either all parallel to the diaphragm edges 36 (as depicted) or all perpendicular to the diaphragm edges 36. In operation, a bias voltage is applied to the Wheatstone bridge. Orienting the piezoresistors 46 in the same direction cancels out common-mode stress effects due to packaging and mounting stresses while still providing high sensitivity. Axial stresses (horizontal and/or vertical) from packaging and temperature effects vary the resistance values of the four resistors in the same way, thereby canceling such unwanted effects. A pressure differential across the diaphragm 34 causes the resistances of the two resistors in opposite legs of the Wheatstone bridge to increase, and the resistances of the other two resistors to decrease, resulting in a differential output voltage of the Wheatstone bridge which is a direct measure of the applied pressure.

Figure 6:
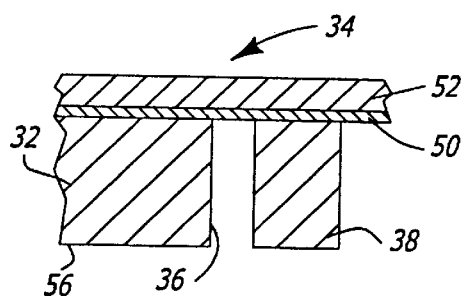
FIG. 6 illustrates a cross-sectional view of a single boss, according to the embodiment of FIG. 2.

FIG. 6 illustrates a cross-sectional view of a single boss, according to the embodiment of FIG. 2. Referring to FIG. 6, the diaphragm 34 (a portion of which is shown) is formed by first depositing or growing an oxide layer 50 on the substrate 32, forming a silicon layer 52 on the oxide layer 50 by a wafer bonding and etch-back technique, and masking and etching the back side 56 of the substrate 32 to form the diaphragm 34. The buried oxide layer 50 acts as an automatic etch stop to provide uniformity in the depth of the etch. In a preferred embodiment, the substrate 32 is etched from the back side 56 using a deep reactive ion etch ("D-RIE") to form substantially vertical sidewalls of the bosses 38. For high pressure designs, the area of the diaphragm may be decreased and/or its thickness may be increased. An epitaxial silicon layer, for example, may be deposited on the silicon layer 52 to achieve this additional thickness. For higher pressure ranges, where the diaphragm 34 is thicker, the etch stop oxide layer 50 may not be required.

The present invention provides improved pressure linearity with a large output signal in response to applied pressure, while providing a higher degree of common-mode cancellation of detrimental effects due to temperature, package induced stresses, and mounting stresses. The source of non-linearity is typically due to stretching of the mid-plane of the diaphragm with large full scale diaphragm displacements. The bosses stiffen the diaphragm, thereby reducing the deflection of the diaphragm which, in turn, improves linearity.

Furthermore, the multiple boss configuration e.g., three bosses) focuses the stress between the bosses to provide stress amplification therebetween, produces identical "inboard" and "outboard" stresses except for sign, and provides high curvature in the thinner regions between the bosses and between a boss and the periphery with low curvature in the boss and frame regions 54.

Figure 7:
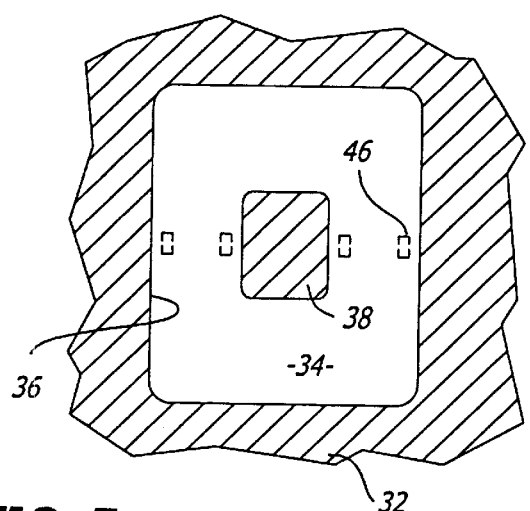
FIG. 7 illustrates a backside view of a single boss configuration, according to another embodiment of the present invention.

FIG. 7 illustrates a backside view of a single boss diaphragm configuration, according to another embodiment of the present invention. In this view, the piezoresistors 46 are shown for clarity purposes only, as they are actually disposed on the topside of the diaphragm 34. The single boss 38 is centrally located on a bottom side of the diaphragm 34 and allows more space between the boss 38 and the periphery 36 (or diaphragm wall). In one embodiment, two piezoresistors are placed near the boss 38 to provide a high tensile stress and the other two piezoresistors are placed near the periphery 36 to provide a high compressive stress, with positive pressure applied to the bottom of the diaphragm (see, e.g., FIG. 2). The single boss configuration retains many of the features of the triple boss configuration, but without the small gaps required between the bosses.

Figure 8:
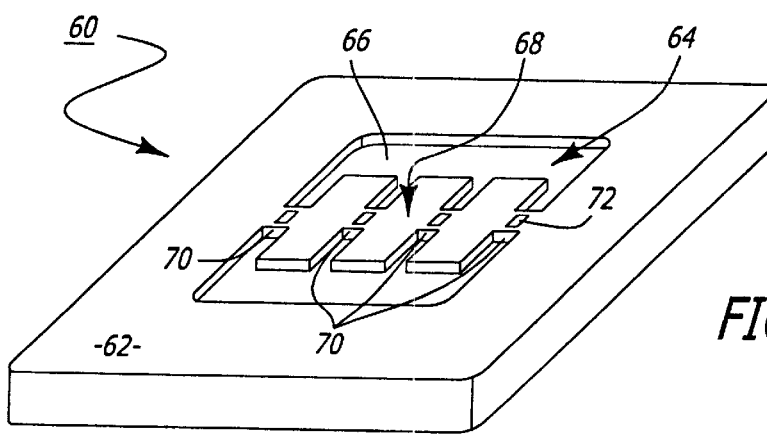
FIG. 8 is a perspective view illustrating a top-etched boss pressure sensor diaphragm configuration, in accordance with another embodiment of the present invention.

FIG. 8 is a perspective view illustrating a top-etched boss pressure sensor diaphragm configuration, in accordance with another embodiment of the present invention. Referring to FIG. 8, the pressure sensor 60 includes a sensor die 62 and a localized recess region 64, with a diaphragm 66 formed on the topside of the sensor die 62. In this embodiment, a dry etch is used to form localized depressions in the diaphragm 66, resulting in three topside bosses 68 connected by four bridge regions 70 (referred to as a "microspine").

A piezoresistor 72 is placed on each of the four bridge regions 70 and are interconnected in a Wheatstone bridge configuration. This configuration reduces the diaphragm stiffness and focuses more bending stress on the bridge regions 70 between the three bosses 68. The bridge regions 70 increase the overall compliance of the diaphragm 66, allowing low pressure to be measured. The pressure sensitivity of the piezoresistors 72 on the bridge regions 70 is enhanced due to the higher stresses which result from the piezoresistors being further from the neutral axis. In this embodiment, pressure sensitivity may be adjusted by, for example, varying the thickness of the diaphragm and/or the depth of the top etch, significantly expanding pressure ranges which the pressure sensor can be used.

Figure 9:
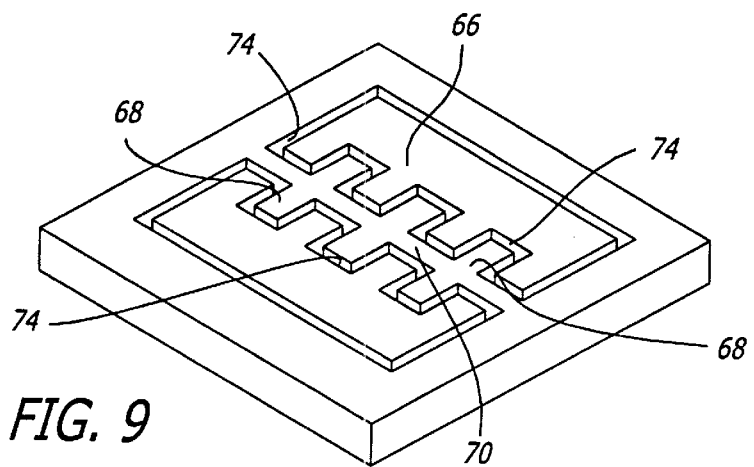
FIG. 9 is a perspective view illustrating a variation of the top-etched boss pressure sensor of FIG. 8.

FIG. 9 is a perspective view illustrating a variation of the top-etched boss pressure sensor of FIG. 8. In this embodiment, a cut groove 74 is made around the periphery of the diaphragm 66, and the topside bosses 68 and the bridge regions 70. This provides flexibility of the diaphragm 66.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A pressure sensor, comprising:
   a semiconductor diaphragm including a first side and a second side, and having a first thickness;
   a raised boss coupled to the first side of the diaphragm along an axis that divides the diaphragm into first and second portions, said raised boss to increase a thickness of the diaphragm in the region occupied by the raised boss to a second thickness; and first, second, third, and fourth piezoresistors disposed on the second side of the diaphragm along the axis and in regions of the first thickness.

2. The pressure sensor of claim 1 wherein the raised boss is substantially rectangular and extends substantially perpendicular to the diaphragm.

3. The pressure sensor of claim 1, wherein the first and second piezoresistors are located between the raised boss and a first edge of the diaphragm, and the third and fourth piezoresistors are located between the raised boss and a second edge of the diaphragm.

4. The pressure sensor of claim 3, wherein the first and third piezoresistors are located in regions of highest compressive stress and the second and fourth piezoresistors are located in regions of highest tensile stress.

5. The pressure sensor of claim 1, wherein the first and second portions are equal in size.

6. The pressure sensor of claim 5, wherein the first, second, third, and fourth piezoresistors are positioned parallel to the axis.

7. The pressure sensor of claim 4, wherein the first, second, third, and fourth piezoresistors are positioned perpendicular to the axis.

8. The pressure sensor of claim 1, wherein the semiconductor diaphragm is substantially rectangular.

9. The pressure sensor of claim 1, wherein the diaphragm senses absolute pressure applied to the first side of the diaphragm.

10. The pressure sensor of claim 1, wherein the diaphragm senses differential pressure applied to the first and second sides of the diaphragm.

11. The pressure sensor of claim 1 wherein first terminals of the first and fourth piezoresistors are coupled to a common terminal, first terminals of the second and third piezoresistors are coupled to a power supply terminal having a bias voltage thereon, second terminals of the first and second piezoresistors are coupled to a first output terminal, and second terminals of the third and fourth piezoresistors are coupled to a second output terminal.

12. The pressure sensor of claim 1 further comprising second and third raised bosses coupled to the first side of the diaphragm along the axis.

13. The pressure sensor of claim 12 wherein the raised boss is spaced apart from the second and third raised bosses by a first distance, the second raised boss is spaced apart from a first edge of the diaphragm by the first distance, and the third raised boss is spaced apart from a second edge of the diaphragm by the first distance.

14. The pressure sensor of claim 13 wherein the first piezoresistor is located between the first edge of the diaphragm and the second raised boss, the second piezoresistor is located between the second raised boss and the raised boss, the third piezoresistor is located between the raised boss and the third raised boss, and the fourth piezoresistor is located between the third raised boss and the second edge of the diaphragm.

15. The pressure sensor of claim 14 wherein the first and second portions are equal in size.

16. The pressure sensor of claim 15 wherein the first, second, third, and fourth piezoresistors are positioned parallel to the axis or perpendicular to the axis.

17. The pressure sensor of claim 16, wherein first terminals of the first and fourth piezoresistors are coupled to a common terminal, first terminals of the second and third piezoresistors are coupled to a power supply terminal having a bias voltage thereon, second terminals of the first and second piezoresistors are coupled to a first output terminal, and second terminals of the third and fourth piezoresistors are coupled to a second output terminal.

18. A pressure sensor, comprising:
 a semiconductor diaphragm including a first side and a second side;
 a boss coupled to the first side of the diaphragm along an axis that divides the diaphragm into two portions; and
 first, second, third, and fourth piezoresistors disposed on the second side of the diaphragm along the axis.

19. The pressure sensor of claim 18 wherein the diaphragm is substantially rectangular, and wherein said boss is substantially centered such that the axis bisects the diaphragm into two equal portions.

20. The pressure sensor of claim 19 wherein the first and second piezoresistors are located between the boss and a first edge of the diaphragm, and the third and fourth piezoresistors are located between the boss and a second edge of the diaphragm.

21. The pressure sensor of claim 20, wherein the first and third piezoresistors are located in regions of highest tensile stress, and wherein the second and fourth piezoresistors are located in regions of highest compressive stress.

22. The pressure sensor of claim 21, wherein the first, second, third, and fourth piezoresistors are positioned parallel to the axis or are positioned perpendicular to the axis.

23. The pressure sensor of claim 22 wherein the first, second, third, and fourth piezoresistors are connected in a wheatstone bridge configuration such that the first and third piezoresistors are connected in first opposite legs of the wheatstone bridge, and the second and fourth piezoreistors are coupled in second opposite legs of the wheatstone bridge.

24. The pressure sensor of claim 23, wherein pressure applied to one or both sides of the diaphragm causes resistances of the first and third piezoresistors to change in a first direction, and resistances of the second fourth piezoresistors to change in a second, opposite direction.

25. The pressure sensor of claim 22 wherein first terminals of the first and fourth piezoresistors are coupled to a common terminal, first terminals of the second and third piezoresistors are coupled to a power supply terminal having a bias voltage thereon, second terminals of the first and second piezoresistors are coupled to a first output terminal, and second terminals of the third and fourth piezoresistors are coupled to a second output terminal.

26. The pressure sensor of claim 25 wherein pressure applied to one or both sides of the diaphragm causes resistances of the first and third piezoresistors to change in a first direction, and resistances of the second and fourth piezoresistors to change in a second, opposite direction such that an output voltage across the first and second output terminals changes in direct proportion to the applied pressure.

27. A semiconductor pressure sensor diaphragm, comprising:
 at least one raised boss disposed along a central axis on a first side of the diaphragm;
 at least two raised bridge regions disposed along the central axis, interconnecting the at least one raised boss and a diaphragm edge, each raised bridge region being narrower than the raised boss; and
 a plurality of piezoresistors disposed on the raised bridge regions of the diaphragm along the central axis.

28. The semiconductor pressure sensor diaphragm of claim 27, wherein the plurality of piezoresistors are oriented parallel to the central axis.

29. The semiconductor pressure sensor diaphragm of claim 27, wherein the plurality of piezoresistors are oriented perpendicular to the central axis.

30. The semiconductor pressure sensor diaphragm of claim 27 wherein the at least one raised boss comprises three raised bosses, the at least two bridge regions comprises four raised bridge regions, and the plurality of piezoresistors comprises four piezoresistors.

* * * * *